Sept. 26, 1967     J. T. LINGLE     3,344,362

MAGNETIC OSCILLATOR APPARATUS

Filed April 28, 1965     3 Sheets-Sheet 1

*INVENTOR.*
JOHN T. LINGLE

BY Roger W. Jensen

ATTORNEY

Sept. 26, 1967   J. T. LINGLE   3,344,362
MAGNETIC OSCILLATOR APPARATUS
Filed April 28, 1965   3 Sheets-Sheet 2

INVENTOR.
JOHN T. LINGLE
BY
Roger W. Jensen
ATTORNEY

Sept. 26, 1967          J. T. LINGLE          3,344,362
MAGNETIC OSCILLATOR APPARATUS
Filed April 28, 1965                              3 Sheets-Sheet 3

INVENTOR.
JOHN T. LINGLE
BY
*Roger W. Jensen*
ATTORNEY

United States Patent Office 3,344,362
Patented Sept. 26, 1967

3,344,362
MAGNETIC OSCILLATOR APPARATUS
John T. Lingle, Bloomington, Minn., assignor to Honeywell Inc., Minneapolis, Minn., a corporation of Delaware
Filed Apr. 28, 1965, Ser. No. 451,483
6 Claims. (Cl. 331—50)

ABSTRACT OF THE DISCLOSURE

A magnetic oscillator utilizing a saturable feedback core for energizing the main switching transistors and further including series switching transistors between the feedback winding and the main switching transistors to permit the application of higher and therefore more positive turn ON and turn OFF voltages for switching the main transistors.

The invention described herein pertains to voltage converters. More particularly the present invention pertains to magnetic oscillators wherein a transformer is provided with a saturable magnetic core. Two main switching transistors are also provided for alternately directing the flow of current through one or the other of two current paths from one polarity terminal to the opposite polarity terminal of a DC voltage supply source. The switching transistors are alternately biased into conductive and nonconductive states responsive to the saturation of the saturable core in the transformer.

The oscillator of the present invention is of the type having an output transformer and a separate current feedback transformer, the feedback transformer being of the saturable core type. A pair of windings on the feedback transformer are connected in series with the primary winding on the output transformer to induce voltages in the windings of the feedback transformer as a function of the input and output current. Only one of the two main switching transistors is conducting at any one time and the main current path during one-half of the cycle is traced from a first terminal of the DC voltage supply source, through the conducting main switching transistor, through one feedback winding on the feedback transformer and through one-half of the primary winding on the output transformer to the other end of the DC voltage supply source. The main current continues to flow through this path until the saturation of the core in the feedback transformer occurs and causes the conducting transistor to turn off and at the same time turn on the alternate main switching transistor. Collapse of transformer leakage flux induces reverse polarity in the feedback transformer, to aid switching. During the second half of the cycle the current is traced from the first terminal of the DC voltage supply source, through the now conducting second main switching transistor, through a second feedback winding on the feedback transformer, and through the alternate half of the primary winding on the output transformer to the opposite side of the voltage supply source. The time required for the saturation of the core establishes the period of oscillation.

The biasing for the switching transistors which causes the switching in response to the saturation of the core is at least in part provided by a center tapped winding on the saturable core transformer. This bias winding has its ends connected to the base electrodes of the two main switching transistors respectively and has the center tap connected to the two major electrodes of the two transistors. The unique feature of the circuit disclosed here is the incorporation of an additional transistor in the base drive circuit of each of the two power transistors. The purpose of the additional transistor is to decouple one of the main switching transistors from the feedback winding during the switching interval. This allows higher back bias voltage during the switching interval by decoupling the transformer winding and thereby prevents the back bias voltage from being clamped by the emitter-base junction of the conducting transistor. Another advantage of the oscillator disclosed here is that it is ideally adapted for synchronization from an external signal source by supplying the signals to the base electrodes of the two transistors in the base drive circuit.

It is therefore an object of the present invention to provide an improved magnetic oscillator.

A more specific object of the present invention is to provide higher back bias voltage to the switching transistors in a magnetic oscillator during the switching interval.

A further object of the present invention is to provide a magnetic oscillator susceptible to synchronization with an external signal source.

These and other objects of the invention will be more apparent upon a consideration of the specification, claims, and drawings in which:

Figure 1:
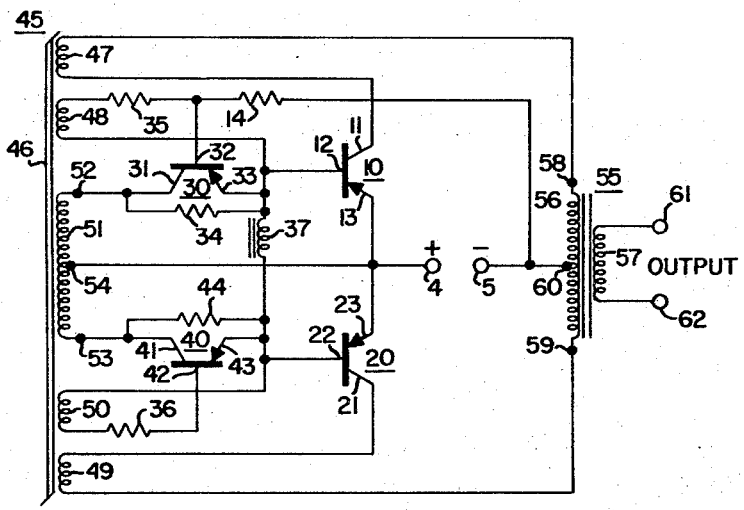
FIGURE 1 is a schematic diagram of a current feedback magnetic oscillator incorporating the present invention.

Referring now to FIGURE 1, a pair of main switching transistors 10 and 20 are provided. Transistor 10 has a collector 11, a base 12, and an emitter 13 and transistor 20 has a collector 21, a base 22, and an emitter 23. Emitters 13 and 23 are connected together and also to a terminal 4 which is adapted for connection to a positive terminal of a DC voltage supply source. Emitter electrodes 13 and 23 are further connected to a center tap 54 of a main winding 51 on a current feedback transformer 45. Main winding 51 further has end terminals 52 and 53 and transformer 45 has additional windings 47, 48, 49, and 50. The oscillator also has an output transformer 55 with a primary winding 56 having end terminals 58 and 59 and center tap 60 and a secondary winding 57 connected between a pair of output terminals 61 and 62.

Collector electrode 11 of transistor 10 is connected to one end of winding 47 on current feedback transformer 45. The other end of winding 47 is connected to end terminal 58 of primary winding 56 on output transformer 55. Collector electrode 21 of transistor 20 is connected to one end of winding 49 on transformer 45. the other end of winding 49 being connected to end terminal 59 of primary winding 56 on output transformer 55. Center tap 60 of winding 56 on output transformer 55 is connected to an input terminal 5 which is adapted for connection to the negative terminal of a DC voltage supply source.

Base electrode 12 of transistor 10 is connected directly to an emitter electrode 33 of a transistor 30. Transistor 30 also has a collector electrode 31 and a base electrode 32. Emitter electrode 33 of transistor 30 is connected to one end of winding 48 on transformer 46 and base electrode 32 is connected to the other end of winding 48 through a resistor 35. Base electrode 32 is also connected to input terminal 5 through a resistor 14. Collector electrode 31 is connected directly to end terminal 52 of winding 51 on transformer 45. A resistor 34 is connected between collector electrode 31 and emitter electrode 33.

Base electrode 22 of transistor 20 is connected directly to an emitter 43 of a transistor 40. Transistor 40 also has a base electrode 42 and a collector electrode 41. Emitter electrode 43 of transistor 40 is connected to one end of winding 50 on transformer 45. The other end of winding 50 is connected to base electrode 42 of transistor 40 through a resistor 36. Collector 41 is connected directly to end terminal 53 of winding 51 and a resistor 44 is connected between collector 41 and emitter 43. An inductor 37 is connected between base electrodes 12 and 22 of transistors 10 and 20 respectively.

Figure 2:
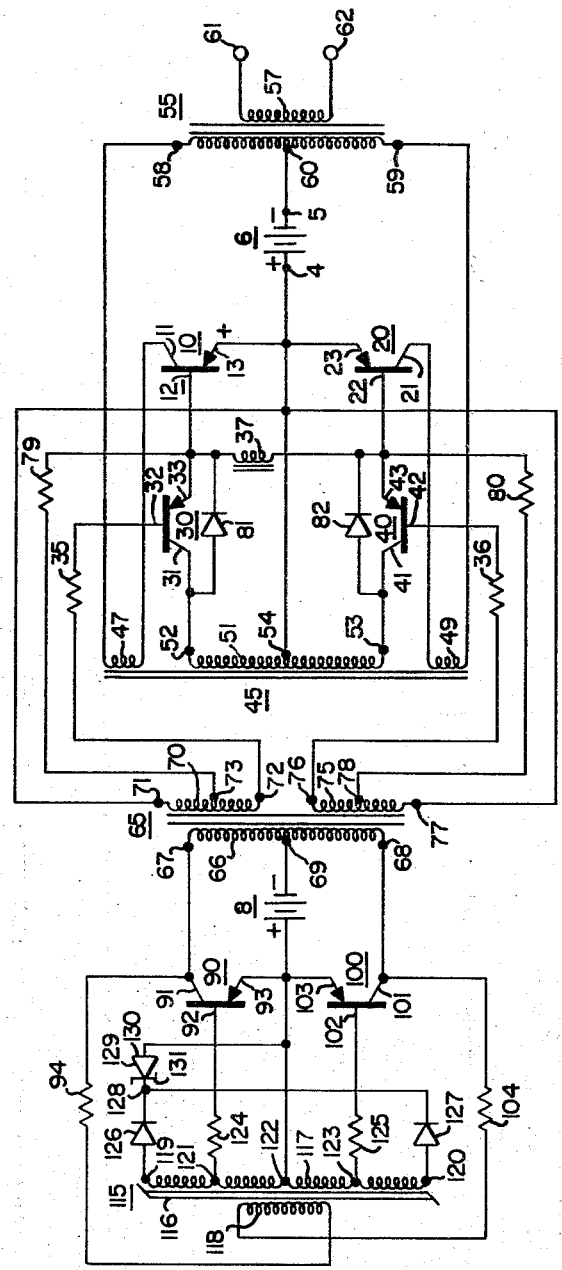
FIGURE 2 is a schematic diagram of the circuit of FIGURE 1 adapted for synchronization with an external drive oscillator.

FIGURE 2 illustrates the apparatus for synchronizing the power oscillator of FIGURE 1 with a drive oscillator. Transistors 10, 20, 30, and 40 and transformers 45 and 55 are interconnected as described with reference to FIGURE 1 except that windings 48 and 58 shown in FIGURE 1 are removed and the base and emitter electrodes of transistors 30 and 40 are instead connected to windings 70 and 75 on a transformer 65. Winding 70 has end terminals 71 and 72 and an intermediate tap 73 and winding 75 has end terminals 76 and 77 and an intermediate tap 78. Transformer 65 further has a winding 66 with end terminals 67 and 68 and an intermediate tap 69. Base electrode 32 of transistor 30 is connected to end terminal 72 of winding 70 on transformer 65 through a resistor 35 and emitter 33 is connected to intermediate tap 73 on winding 70 through a resistor 79. End terminal 71 of winding 70 is connected to emitter electrodes 13 and 23 of transistors 10 and 20. Base electrode 42 of transistor 40 is connected to end terminal 76 of winding 75 on transformer 65 through a resistor 36, and emitter electrode 43 of transistor 40 is connected to intermediate tap 78 of winding 75 through a resistor 80. End terminal 77 of winding 75 is connected to emitter electrodes 13 and 23 of transistors 10 and 20 respectively. Resistor 34 in FIGURE 1 is replaced in FIGURE 2 by a diode 81 connected between collector 31 and emitter 33 of transistor 30 and oriented for forward current flow from collector 31 to emitter 33. Resistor 44 of FIGURE 1 is also replaced in FIGURE 2 by a diode 82 connected between collector 41 and emitter 43 of transistor 40 and oriented for forward current flow from collector 41 to emitter 43.

Transformer 65 is the output transformer of a drive oscillator which provides the synchronizing signal for the power oscillator. The drive oscillator further has a pair of switching transistors 90 and 100 and a feedback transformer 115. Transistor 90 has a collector 91, a base 92, and an emitter 93 and transistor 100 has a collector 101, a base 102 and an emitter 103.

Transformer 115 has a winding 117 which has end terminals 119 and 120, a center tap 122, an intermediate tap 121 between end terminal 119 and center tap 122 and an intermediate tap 123 between end terminal 120 and center tap 122. Transformer 115 further has a winding 118. Collector 91 of transistor 90 is connected directly to end terminal 67 of winding 66 on transformer 65, and collector 101 of transistor 100 is connected directly to end terminal 68 of winding 66. Center tap 69 of winding 66 is connected to the negative side of a DC voltage source 8. Emitter electrodes 93 and 103 of transistors 90 and 100 respectively are connected to each other and to the positive side of DC voltage supply source 8 and are further connected to center tap 122 of winding 117 on transformer 115. Base electrode 92 of transistor 90 is connected to intermediate tap 121 on winding 117 through a resistor 124 and base electrode 102 of transistor 100 is connected to intermediate tap 123 of winding 117 through a resistor 125. End terminal 119 of winding 117 is connected to a junction point 128 through a diode 126, diode 126 being oriented for forward current flow from end terminal 119 to junction point 128. End terminal 120 of winding 117 is connected to junction 128 through a diode 127 which is oriented for forward current flow from end terminal 120 to junction point 128. Junction point 128 is connected to cathode 131 of a zener diode 129. Zener diode 129 further has an anode 130 connected directly to emitter electrodes 93 and 103 of transistors 90 and 100 respectively. Voltage feedback is provided to transformer 115 by winding 118 and resistors 94 and 104 which are connected between end terminals 67 and 68 of winding 66 on output transformer 65. Transformer 115 has a saturable magnetic core 116.

Figure 3:
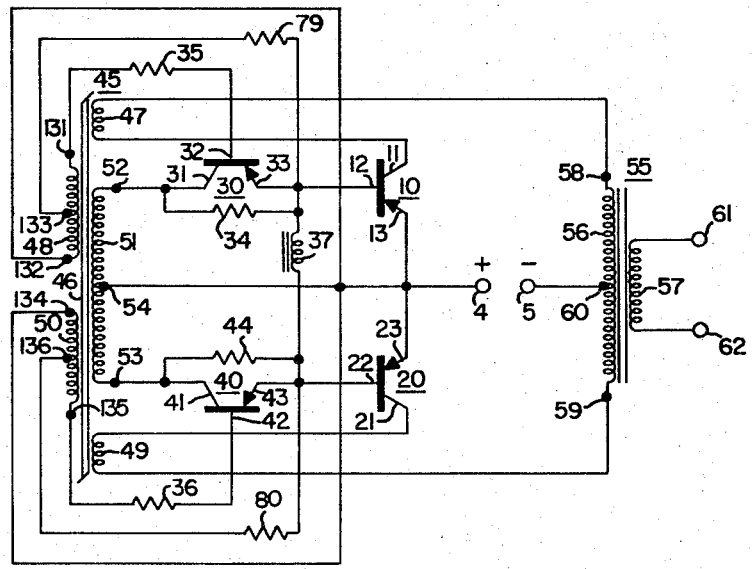
FIGURE 3 is a schematic diagram of a magnetic oscillator similar to that of FIGURE 1, but which incorporates additional feedback.

The circuit of FIGURE 3 is almost identical to that of FIGURE 1 except that additional feedback is provided. In FIGURE 3 winding 48 on transformer 45 is provided with end terminals 131 and 132 and an intermediate tap 133 and winding 50 is provided with end terminals 134 and 135 and an intermediate tap 136. Base electrode 32 of transistor 30 is connected to end terminal 131 of winding 48 through a resistor 35 and emitter electrode 33 is connected to intermediate tap 133 of winding 48 through resistor 79. The other end terminal 132 of winding 48 is connected to emitter electrodes 13 and 23 of transistors 10 and 20 respectively. Base electrode 42 of transistor 40 is connected to end terminal 135 of winding 50 through resistor 36 and emitter electrode 43 is connected to intermediate tap 136 of winding 50 through a resistor 80. End terminal 134 of winding 50 is connected to emitter electrodes 13 and 23 of transistors 10 and 20. In other respects the circuit of FIGURE 3 is similar to the circuit of FIGURE 1.

Figure 4:
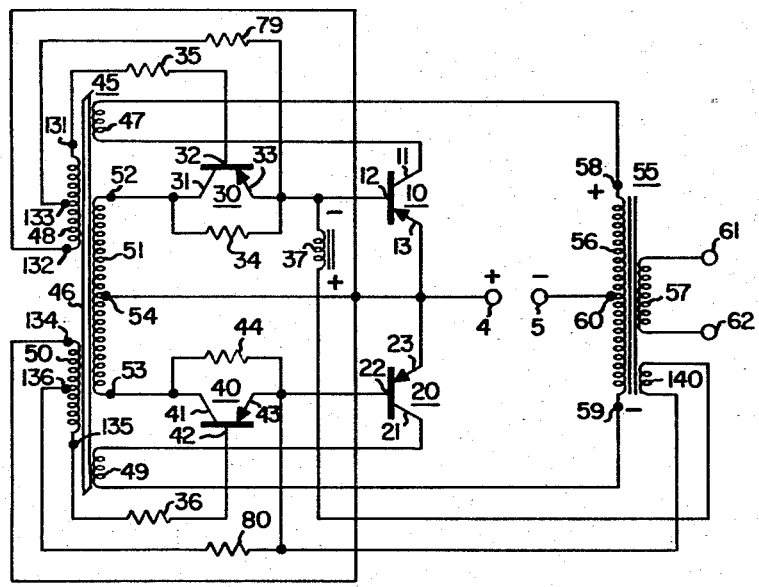
FIGURE 4 is a variation of FIGURE 3 with additional drive applied from the output transformer to the base electrodes of the main switching transistors.

FIGURE 4 is in all respects identical to FIGURE 3 with the exception of an additional winding 140 on output transformer 55. The ends of winding 140 are connected between base electrode 22 of transistor 20 and one end of inductive choke 37, so that winding 140 and choke 37 provide a series current path between base electrodes 12 and 22 of transistors 10 and 20.

*Operation*

In the circuit of FIGURE 1 transistors 10 and 20 conduct during the alternate halves of each cycle and the switching is triggered by the saturation of saturable core 46 on transformer 45. For the purpose of this discussion assume that at this time transistor 10 is conducting and transistor 20 is biased into the nonconductive state. During this half of the cycle the main current can be traced from positive terminal 4 through transistor 10 from emitter 13 to collector 11, through winding 47 on transformer 45, and through winding 56 on transformer 55 from end terminal 58 to center tap 60 and on to negative terminal 5. As a result of this current a voltage drop occurs across winding 47 and voltage is induced in the remaining windings of transformer 45. During this half of the cycle the induced voltage is such that the bottom ends of all windings in FIGURE 1 on transformer 45 are positive with respect to the top ends. As a result winding 48 places emitter 33 of transistor 30 at a positive potential with respect to base 32 and causes transistor 30 to conduct, thereby connecting end terminal 52 of winding 51 directly to base electrode 12 of transistor 10. The voltage induced in the upper half of winding 51 between end terminal 52 and center tap 54 places a negative (or forward) bias to the base-emitter junction of transistor 10 to maintain transistor 10 in conduction. The voltage induced in winding 50 places a reverse bias on the emitter base junction of transistor 40, maintaining transistor 40 in an "off" condition. Furthermore the voltage induced in the lower half of winding 51 between end terminal 53 and intermediate tap 54 places a reverse bias on emitter-base junction of transistor 20 through resistor 44 to maintain transistor 20 in an "off" condition during this half of the cycle. Because transistor 20 is biased "off" no current flows through winding 49.

This current continues to flow in the first direction until core 46 of transformer 45 saturates. Upon saturation of core 46, the impedance to current flow in the primary winding 47, suddenly decreases, power transfer by magnetic coupling between primary winding 47 and secondary winding 48 and secondary winding 51 diminishes, and the forward drive current is removed from the base emitter junction of transistor 10. The resulting collapse of transformer leakage flux induces in the windings of transformer 45 voltages of the opposite polarity, making the upper ends of windings on transformer 45 positive with respect to the lower ends. This polarity reversal switches the oscillator transistors into the opposite bistable state where positive feedback maintains this state for the next half cycle. This opposite induced voltage on winding 48 places a reverse bias on transistor 30 and turns it "off." The voltage induced in the upper half of winding 51 is shunted by transistor 30 through resistor 34 to place a reverse bias on transistor 10 and turn it off. At the same time this same polarity voltage places a forward bias on the emitter-base junction of transistor 40 and places it in conduction connecting base electrode 22 of transistor 20 directly to end terminal 53 of winding 51. The voltage induced on the lower half of winding 51 is placed directly across emitter-base junction of transistor 20 to produce a forward bias and turn transistor 20 "on." The main current now starts to flow from input terminal 4, through transistor 20, through series winding 49 on transformer 45, and through the lower half of winding 56 from end terminal 59 to intermediate tap 60, and on to input terminal 5 which is connected to the negative side of the DC voltage supply source. The current now flowing through winding 49 provides the current feedback to transformer 45 resulting in voltages on the windings of transformer 45 which tend to maintain transistors 40 and 20 conducting and transistors 30 and 10 nonconducting. The cycle is now complete. As can be seen the frequency of operation is determined by the saturation rate of core 46 in transformer 45.

An additional choke coil 37 is present between the base electrode of transistors 10 and 20 and effectively aids the switching of transistors 10 and 20 in both directions. When transistor 10 is conducting, energy is stored in choke 37 by current flowing out of the lower end of winding 51, through resistor 44, through choke 37, and transistor 30 back to the upper side of winding 51. When switching occurs this current path is broken by the reversal in polarity of winding 48 which turns off transistor 30. The flux in the core of choke 37 resets, reversing the polarity of voltage across choke 37 to maintain its current flow, causing base electrode 12 of transistor 10 to become more positive and base 22 of transistor 20 to become more negative, thereby speeding up the switching process.

The function of transistors 30 and 40 is to prevent the back bias voltage on the non-conducting transistor from being clamped by the emitter base junction of the conducting transistor. As becomes evident from the above discussion of operation, transistors 30 and 40 decouple the respective power transistors 10 and 20 from the current feedback winding 51 during the switching interval.

Resistor 14 connected between base electrode 32 of transistor 30 and negative potential terminal 5 insures starting.

FIGURE 2 illustrates how the circuit of FIGURE 1 is easily adaptable for synchronization from an external source. For certain applications a requirement imposed upon the converter is that its output be of a relatively constant frequency under conditions of changing load or input voltage. The frequency variations with load in the circuit of FIGURE 1 might be too great for some applications because of the saturation rate of core 46 is determined by the magnitude of the load current flowing through winding 56 on transformer 55 and the emitter base impedance of transistors 10 and 20. The circuit of FIGURE 2 provides the advantages of both the current feedback from the primary side of the output transformer and nearly constant frequency. The switching signal is obtained from a voltage drive oscillator comprised of transistors 90 and 100, output transformer 65, and feedback transformer 115. Feedback transformer 115 has a saturable core 116 which determines the frequency of oscillation. The frequency is fixed by a clamping circuit on the oscillator feedback transformer 115. Diodes 126 and 127, together with zener diode 129, limit the voltage induced across winding 117 to the voltage rating of zener diode 129. The frequency of oscillation is proportional to the voltage time integral across transformer 115 and is therefore virtually constant. The drive oscillator shown is a Jensen type square-wave oscillator well-known to those skilled in the art. The output of the drive oscillator appears across transformer 65.

When the signal from the drive oscillator is such that the upper end of winding 66 is positive with respect to its lower end of the voltage induced on secondary windings 70 and 75 is also such that the upper ends of windings 70 and 75 are positive with respect to the lower ends. This polarity of induced voltage places a forward bias on the emitter-base junctions of transistors 10 and 30 and places a reverse bias on emitter-base junctions of transistors 20 and 40 causing transistors 10 and 30 to conduct and maintain transistors 20 and 40 in the non-conducting state. As the polarity of signal at the output of the drive oscillator changes transistors 10 and 30 are turned "off" and transistors 20 and 40 are turned "on." The operation of the power oscillator in FIGURE 2 is in all respects similar to the operation of the oscillator of FIGURE 1 with the exception that the switching signal in FIGURE 1 is obtained from the saturation of transformer 45, while in FIGURE 2 the signal is obtained from the output of the drive oscillator. Transistors 30 and 40 in FIGURE 2 perform the same function of decoupling the base electrode of the conducting transistor from the current feedback winding 51 during the switching interval and prevent the back bias voltage on the "off" transistor from being clamped by the emitter base junction of the conducting transistor. At the same time transisors 30 and 40 perform the additional function which enables the power oscillator to be synchronized with the signal from the drive oscillator. This circuit combines the advantages of having current feedback and extremely stable frequency. The external synchronizing signal source is of course not limited to the type of drive oscillator shown in FIGURE 2, which is shown for illustration purposes only, but may be one of many appropriate signal sources known to those skilled in the art.

In the circuit of FIGURE 3 an additional voltage drive feedback is provided between the base and emitter junctions of transistors 10 and 20. Windings 48 and 50 on transformer 45 in FIGURE 3, which correspond to windings 48 and 50 of FIGURE 1, have an additional number of turns each from which the voltage feedback is derived. Intermediate tap 133 of winding 48 in FIGURE 3 corresponds to the lower end of winding 48 in FIGURE 1 and is connected through resistor 79 to emitter electrode 33 of transistor 30, and also to base electrode 12 of transistor 10. End terminal 132 of winding 48 is connected to emitter electrode 13 of transistor 10. Thus, the voltage induced in winding 48 between intermediate tap 133 and end terminal 132 is impressed across the emitter base junction of transistor 10 through resistor 79. The same remark can be made about the portion of winding 50 between end terminal 134 and intermediate tap 136 and its relation to transistor 20. Thus, winding 48 provides voltage drive feedback to both transistors 10 and 30 and winding 50 provides voltage drive feedback to both transistors 20 and 40. Transistor 30 provides a low impedance current path between base electrode 12 of transistor 10 and end terminal 52 of winding 51 while transistor 10 is conducting and provides a high impedance path while transistor 10 is non-conducting, to provide a higher reverse bias voltage for the base-emitter junction of transistor 10. Transistor 40 provides a low impedance current path between base electrode 22 of transistor 20 and end terminal 53 of winding 51 while transistor 20 is conducting and provides a relatively high impedance path when transistor 20 is nonconducting.

The improvement in the circuit disclosed here provides higher feedback voltage during the switching interval by decoupling the current feedback transformer winding. This results in higher back bias voltage with minimum dissipation to enhance operation at high temperatures. It also results in more rapid switching and the forward bias path has minimum impedance to minimize dissipation and achieve higher efficiency. This advantage is especially important in applications for the conversion of power from low voltage high current sources. Further, as illustrated above, it is possible to synchronize this current drive oscillator to a fixed frequency from an external source.

If the oscillator is designed to have its operating frequency vary in proportion to the input voltage it may be desirable to connect additional drive power in series with choke coil 37. As the frequency of the oscillator increases it is desirable to also increase the voltage applied to choke coil 37 in order to maintain the energy stored in choke coil 37 constant. This additional power is derived in the circuit of FIGURE 4 from a winding 140 on output transformer 55. The voltage induced in winding 140 is added in series with choke 37 between base electrode 12 and 22 of transistors 10 and 20.

Many variations and embodiments are possible within the spirit of this invention. It is, therefore, understood that the specific embodiment of my invention shown here is for the purpose of illustration only, and that my invention is limited only by the scope of the appended claims.

I claim:

1. In a magnetic oscillator wherein first and second main switching transistors are provided and switched to alternately direct the current from one terminal to a DC voltage supply source to its opposite polarity terminal through a first and a second path during alternate halves of the oscillator cycle, the feedback for switching said transistors being at least in part provided by a saturable core transformer having a feedback winding connected to provide bias across the base-emitter junction of each of the two main switching transistors, an improvement comprising:
   a third switching transistor associated with said first transistor and having its collector and emitter connected in series between the feedback winding and the base electrode of said first switching transistor;
   a fourth switching transistor associated with said second transistor and having the collector and emitter connected in series between the feedback winding and the base electrode of said second switching transistor; and
   means connected to the base electrodes of said third and fourth transistors for switching said third and fourth transistors in response to the saturation of said saturable core transformer such that each of said third and fourth transistors are in the conductive state when its associated transistor is conducting and is in the non-conductive state when its associated transistor is in or in the process of switching into the non-conductive state.

2. A magetic oscillator comprising:
   first, second, third, and fourth transistors, each having a base, an emitter, and a collector;
   a pair of output terminals;
   an output transformer having a primary winding with first and second end terminals and an intermediate tap, and also having a secondary winding connected between said output terminals;
   a feedback transformer with a saturable magnetic core and having
      a main winding with first and second end terminals connected to collector electrodes of third and fourth transistors respectively and having a center tap connected to the emitter electrodes of first and second transistors,
      a second winding connected between the collector electrode of said first transistor and the first end terminal of the primary winding on said output transformer,
      a third winding connected between the collector electrode of said second transistor and the second end terminal of the primary winding on said output transformer,
      a fourth winding connected between base and emitter electrodes of said third transistor, and
      a fifth winding connected between base and emitter electrodes of said fourth transistor;
   means connecting the base electrodes of first and second transistors of emitter electrodes of third and fourth transistors respectively; and
   a source of DC electric potential connected between the center tap of primary winding on the output transformer and emitter electrodes of said first and second transistors.

3. A magnetic oscillator comprising:
   first, second, third and fourth transistors, each having a base, an emitter, and a collector;
   a pair of output terminals;
   an output transformer having a primary winding with first and second end terminals and an intermediate tap, and also having a secondary winding connected between said output terminals;
   a feedback transformer with a saturable magnetic core and having
      a main winding with first and second end terminals connected to collector electrodes of third and fourth transistors respectively and having a center tap connected to the emitter electrodes of first and second transistors,
      a second winding connected between the collector electrode of said first transistor and the first end terminal of the primary winding on said output transformer,
      a third winding connected between the collector electrode of said second transistor and the second end terminal of the primary winding on said output transformer,
      a fourth winding connected between base and emitter electrodes of said third transistor, and
      a fifth winding connected between base and emitter electrodes of said fourth transistor;
   means connecting the base electrodes of first and second transistors to emitter electrodes of third and fourth transistors respectively;
   a source of DC electric potential connected between the center tap of primary winding on the output transformer and emitter electrodes of said first and second transistors;
   a first impedance element connected between the emitter and the collector of said third transistor;
   a second impedance element connected between the emitter and collector of said fourth transistor; and
   an inductive choke, connected between the base of said first transistor and the base of said second transistor.

4. A power oscillator comprising:
   first, second, third, and fourth transistors, each having a base, an emitter, and a collector;
   a pair of output terminals;
   an output transformer having a primary winding with first and second end terminals and an intermediate tap, and also having a secondary winding connected between said output terminals;
   a feedback transformer having
      a main winding with first and second end terminals connected to collector electrodes of third and fourth transistors respectively and having a center tap connected to the emitter electrodes of first and second transistors, a second winding connected between the collector electrode of said first transistor and the first end terminal of the primary winding on said output transformer, and a third winding connected between the collector electrode of said second transistor and the second end terminal of the primary winding on said output transformer, means connecting the base electrodes of first and second transistors to emitter electrodes of third and fourth transistors respectively;

a source of DC electric potential connected between the center tap of primary winding on the output transformer and emitter electrodes of said first and second transistors;

an input transformer having a primary winding and having a first secondary winding connected between base and emitter electrodes of said third transistor and a second secondary winding connected between base and emitter electrodes of said fourth transistor; and a drive oscillator connected to the input winding of said input transformer whereby the frequency of said power oscillator is synchronized with the frequency of said drive oscillator.

5. A magnetic oscillator comprising:

first, second, third, and fourth transistors, each having a base, an emitter, and a collector;

a pair of output terminals;

an output transformer having a primary winding with first and second end terminals and an intermediate tap, a secondary winding connected between said output terminals, and also having a feedback winding;

a feedback transformer with a saturable magnetic core and having, a main winding with first and second end terminals connected to collector electrodes of third and fourth transistors respectively and having a center tap connected to the emitter electrodes of said first and second transistors, a second winding connected between the collector electrode of said first transistor and the first end terminal of the primary winding on said output transformer, a third winding connected between the collector electrode of said second transistor and the second end terminal of the primary winding on said output transformer, a fourth winding connected between base and emitter electrodes of said third transistor, and a fifth winding connected between base and emitter electrodes of said fourth transistor;

means connecting the base electrodes of first and second transistors to emitter electrodes of third and fourth transistors respectively;

a source of DC electric potential connected between the center tap of primary winding on the output transformer and emitter electrodes of said first and second transistors;

a first impedance element connected between the emitter and the collector of said third transistor;

a second impedance element connected between the emitter and collector of said fourth transistor; and an inductive choke connected in series with said feedback winding on said output transformer, said series circuit being connected between the base of said first transistor and the base of said second transistor.

6. A power oscillator comprising:

first, second, third, and fourth transistors;

an output transformer having a center tapped primary winding and a secondary winding;

a current feedback transformer having a first center tapped winding and also having second and third windings;

a source of direct current electric potential having first and second terminals;

means interconnecting said first and second transistors to alternately conduct current from said voltage source through alternate halves of said primary winding on said output transformer and through said second and third windings on said feedback transformer;

means interconnecting said third transistor with said center tapped winding on said feedback transformer and said first transistor to apply current feedback from said center tapped winding through the collector-emitter junction of the third transistor to the base-emitter junction of said first transistor;

means interconnecting said fourth transistor with said center tapped winding on said feedback transformer and said second transistor to apply current feedback from said center tapped winding through the collector-emitter junction of said fourth transistor to the base-emitter junction of said second transistor;

biasing means connected to said third and said fourth transistors to operate said third and said fourth transistors in a manner to respectively decouple said first and said second transistors when in the process of switching into non-conductive state and to provide a high voltage reverse bias to the base-emitter junction of the non-conducting transistor while at the same time providing low impedance coupling between the current feedback winding and the conducting transistor.

References Cited

UNITED STATES PATENTS

| | | | |
|---|---|---|---|
| 3,206,694 | 9/1965 | Bates | 331—113 X |
| 3,219,906 | 11/1965 | Keller et al. | 331—113 X |
| 3,235,818 | 2/1966 | Meszaros et al. | 321—2 X |
| 3,308,397 | 3/1967 | Morgan | 331—113 |

ROY LAKE, *Primary Examiner.*

J. B. MULLINS, *Assistant Examiner.*